United States Patent
Chung et al.

(10) Patent No.: US 10,274,132 B2
(45) Date of Patent: Apr. 30, 2019

(54) MULTI-SEALED NOZZLE AND PRESSURE VESSEL INCLUDING THE SAME

(71) Applicants: Hyundai Motor Company, Seoul (KR); Kia Motors Corporation, Seoul (KR); ILJIN composite, Jeollabuk-do (KR)

(72) Inventors: Jae Han Chung, Incheon (KR); Chang Ho Kim, Gyeonggi-do (KR); Ki Ho Hwang, Seoul (KR); Seok Bong Heo, Jeollabuk-do (KR); Jong Lyul Kim, Jeollabuk-do (KR); Do Yeun Kim, Jeollabuk-do (KR)

(73) Assignees: Hyundai Motor Company, Seoul (KR); Kia Motors Corporation, Seoul (KR); ILJIN composite, Jeollabuk-do (KR)

( * ) Notice: Subject to any disclaimer, the term of this patent is extended or adjusted under 35 U.S.C. 154(b) by 127 days.

(21) Appl. No.: 15/281,188

(22) Filed: Sep. 30, 2016

(65) Prior Publication Data
US 2017/0175950 A1    Jun. 22, 2017

(30) Foreign Application Priority Data
Dec. 16, 2015 (KR) .................. 10-2015-0180246

(51) Int. Cl.
*F17C 13/00* (2006.01)
*F17C 1/00* (2006.01)
*F17C 13/04* (2006.01)

(52) U.S. Cl.
CPC ............. *F17C 1/00* (2013.01); *F17C 13/04* (2013.01); *F17C 2205/0323* (2013.01); *F17C 2221/012* (2013.01); *F17C 2221/014* (2013.01); *F17C 2221/033* (2013.01); *F17C 2260/036* (2013.01); *F17C 2270/0184* (2013.01); *Y02E 60/321* (2013.01); *Y02T 10/32* (2013.01)

(58) Field of Classification Search
CPC ........ F17C 2260/036; F17C 2205/0305; F17C 2205/0302; F17C 2203/012; F17C 2203/011; F17C 2205/0323; F17C 13/04; F17C 1/00
USPC .................................. 220/601, 582
See application file for complete search history.

(56) References Cited

U.S. PATENT DOCUMENTS

| | | | | |
|---|---|---|---|---|
| 5,429,845 | A * | 7/1995 | Newhouse | F17C 1/16 138/30 |
| 9,689,531 | B2 * | 6/2017 | Ulekleiv | F17C 1/06 |

FOREIGN PATENT DOCUMENTS

| | | |
|---|---|---|
| JP | 2004-211783 A | 7/2004 |
| JP | 2011-102614 A | 5/2011 |
| KR | 2009-0121761 A | 11/2009 |
| KR | 2013-0083340 A | 7/2013 |

(Continued)

*Primary Examiner* — Stephen J Castellano
(74) *Attorney, Agent, or Firm* — Mintz Levin Cohn Ferris Glovsky and Popeo, P.C.; Peter F. Corless

(57) ABSTRACT

A pressure vessel for storing high-pressure gas has a structure including: a nozzle body which is coupled to a vessel body that defines an inner wall surface of the pressure vessel, and has an inner flow path through which gas flows inside and outside of the pressure vessel; and a locker which is fastened to a lower portion of the nozzle body, and the structure is configured to provide dual sealing including sealing at an inclined surface by fastening force of the locker generated by an inclined pressing end of the locker, and sealing in the locker by sealing members.

20 Claims, 4 Drawing Sheets

(56) References Cited

FOREIGN PATENT DOCUMENTS

KR      2014-0128038 A    11/2014
WO   WO-2013/000956 A1 *  1/2013

\* cited by examiner

MULTI-SEALED NOZZLE AND PRESSURE VESSEL INCLUDING THE SAME

CROSS-REFERENCE TO RELATED APPLICATION

This application claims under 35 U.S.C. § 119(a) the benefit of Korean Patent Application No. 10-2015-0180246 filed on Dec. 16, 2015, the entire contents of which are incorporated herein by reference.

BACKGROUND (a) Technical Field

The present invention relates to a pressure vessel for storing high-pressure gas, more particularly, to a structure for ensuring gastightness of a nozzle unit vulnerable to a gas leak in a pressure vessel for storing high-pressure gas, and a pressure vessel including the nozzle unit.

(b) Description of the Related Art

A gas storage vessel is needed to store various types of gases such as hydrogen, nitrogen, and natural gas and discharge the stored gas as necessary. In particular, gas needs to be stored in a high-pressure state because the storage density of gas in the vessel is low, and under this high pressure environment, it is essential to use a pressure vessel.

For example, in the case of alternative fuel gas vehicles (fuel cell vehicles or compressed natural gas vehicles), structures of storage systems vary in accordance with a method of storing fuel gas, and recently, a method which stores gas in the form of compressed gas in consideration of costs, weight, and simplicity of the storage system, has been considered. However, because energy storage density of gaseous fuel is low, the storage amount or storage pressure needs to be increased to ensure a longer traveling distance. In the case of a vehicle, a space for mounting a gas storage system is limited, and there is a limitation in increasing a size of a storage tank. As a result, it is critically important to tank technology to safely store higher pressure gas.

In the case of a composite tank among fuel gas storage tanks, an outer cover is reinforced by a fiber reinforced composite material with high specific strength and specific stiffness, and a liner for maintaining gastightness is inserted into the composite tank in order to withstand internal pressure caused by compressed gas. Based on a material of the liner, the shape of the fuel gas storage tank is classified into a type 3 tank in which a liner made of a metallic material such as aluminum is inserted, and a type 4 tank in which a high-density polymer liner is inserted. The type 3 tank has relatively high stability but is expensive and has a low anti-fatigue property. In contrast, the type 4 tank is inexpensive and has better anti-fatigue property in comparison with the type 3 tank, but could have a safety problem such as a leakage of hydrogen and deterioration of anti-permeation performance. In particular, because of a difference in material between a metallic nozzle and a plastic body which are applied to mount an external valve, ensuring gastightness (soundness) at a coupling portion is critical.

The above information disclosed in this Background section is only for enhancement of understanding the background of the invention and therefore it may contain information that does not form the prior art that is already known in this country to a person of ordinary skill in the art.

SUMMARY

The present invention provides a nozzle structure which is simple compared to a conventional nozzle having a complicated structure (e.g., an existing type 4 liner) and ensures gastightness and high reliability, and a pressure vessel including the same.

In one aspect, the present invention provides a nozzle for a pressure vessel, including: a nozzle body which is coupled to a vessel body that defines an inner wall surface of the pressure vessel, and has an inner flow path through which gas flows inside and outside of the pressure vessel; and a locker which is fastened to a lower portion of the nozzle body, in which the locker has a fastening portion which is fastened to the nozzle body, an extension portion which extends outwardly from the fastening portion, and a pressing end which is formed at one side of the extension portion and has an annular inclined surface inclined inwardly, the pressing end is configured to press the vessel body while being in contact with the vessel body along the annular inclined surface when the locker is fastened to the nozzle body, and the nozzle further includes a first sealing member for blocking gas from flowing in from a gas inflow pathway formed along the annular inclined surface.

In a preferred embodiment, the locker may be thread-fastened to the inner flow path of the nozzle body by the fastening portion.

In another preferred embodiment, an annular groove may be formed in the locker by the inclined surface of the pressing end and an upper surface of the extension portion, and a part of the nozzle body and a part of the vessel body may be accommodated in the groove so as to be in contact with the extension portion.

In still another preferred embodiment, when the locker is fastened to the nozzle body, the first sealing member may be placed in the groove of the locker in a state in which the first sealing member is interposed between the nozzle body and the vessel body.

In yet another preferred embodiment, the inclined surface of the pressing end may be an inclined surface inclined at a predetermined angle with respect to a fastening direction of the fastening portion.

In still yet another preferred embodiment, an extending insertion portion, which extends in a length direction of the inner flow path of the nozzle body, may be formed at an upper side of the fastening portion of the locker, and a second sealing member may be interposed between the extending insertion portion and the nozzle body.

In a further preferred embodiment, a vessel valve may be inserted and mounted into the inner flow path of the nozzle body, and a third sealing member may be interposed between an outer surface of the vessel valve and an inner surface of the extending insertion portion.

In another further preferred embodiment, the third sealing member may be positioned closer to a vessel inlet side than the second sealing member.

In still another further preferred embodiment, the first sealing member may be an O-ring.

In yet another further preferred embodiment, an annular groove, which includes the upper surface of the extension portion, may be formed in the locker, and the first sealing member may be placed in the groove.

In still yet another further preferred embodiment, the first sealing member may be a gasket which is in contact with a part of the metallic nozzle and a part of the vessel body.

In a still further preferred embodiment, the nozzle body and the vessel body may be configured to have a contact surface parallel to the inclined surface of the locker, and the nozzle body may be formed to have an annular protruding portion which protrudes below the vessel body from a contact surface with the first sealing member.

In another aspect, the present invention provides a pressure vessel including: a nozzle body which has an inner flow path through which gas flows inside and outside of the pressure vessel; a vessel body which is coupled to the nozzle body to define an inner wall surface of the pressure vessel; and a locker which is fastened to a lower portion of the nozzle body, in which the locker has a fastening portion which is fastened to the nozzle body, an extension portion which extends outwardly from the fastening portion, and a pressing end which is formed at one side of the extension portion and has an annular inclined surface inclined inwardly, the pressing end is configured to press the vessel body while being in contact with the vessel body along the annular inclined surface when the locker is fastened to the nozzle body, and the pressure vessel further includes a first sealing member for blocking gas from flowing in from a gas inflow pathway formed along the annular inclined surface.

In a preferred embodiment, the locker may be thread-fastened to the inner flow path of the nozzle body by the fastening portion.

In another preferred embodiment, an annular groove may be formed in the locker by the inclined surface of the pressing end and an upper surface of the extension portion, and a part of the nozzle body and a part of the vessel body may be accommodated in the groove so as to be in contact with the extension portion.

In still another preferred embodiment, when the locker is fastened to the nozzle body, the first sealing member may be placed in the groove of the locker in a state in which the first sealing member is interposed between the nozzle body and the vessel body.

In yet another preferred embodiment, the inclined surface of the pressing end may be an inclined surface inclined at a predetermined angle with respect to a fastening direction of the fastening portion.

In still yet another preferred embodiment, an extending insertion portion, which extends in a length direction of the inner flow path of the nozzle body, may be formed at an upper side of the fastening portion of the locker, and a second sealing member may be interposed between the extending insertion portion and the nozzle body.

In a further preferred embodiment, a vessel valve may be inserted and mounted into the inner flow path of the nozzle body, and a third sealing member may be interposed between an outer surface of the vessel valve and an inner surface of the extending insertion portion.

In another further preferred embodiment, the third sealing member may be positioned closer to a vessel inlet side than the second sealing member.

In still another further preferred embodiment, the first sealing member may be an O-ring.

In yet another further preferred embodiment, an annular groove, which includes the upper surface of the extension portion, may be formed in the locker, and the first sealing member may be placed in the groove.

In still yet another further preferred embodiment, the first sealing member may be a gasket which is in contact with a part of the metallic nozzle and a part of the vessel body.

In a still further preferred embodiment, the nozzle body and the vessel body may be configured to have a contact surface parallel to the inclined surface of the locker, and the nozzle body may be formed to have an annular protruding portion which protrudes below the vessel body from a contact surface with the first sealing member.

In a yet still further preferred embodiment, the pressure vessel may further include a composite reinforcing layer which surrounds the vessel body outside the vessel body.

In a yet still further preferred embodiment, the nozzle body may be made of metal, and the vessel body may be a polymer liner.

The exemplary embodiment of the present invention provides a nozzle structure for a pressure vessel, which may simplify a shape by solving a drawback of a gastight structure of the existing liner boss portion, may reduce a size and weight, and may greatly reduce the likelihood of leakage of hydrogen by improving gastightness.

In particular, according to the exemplary embodiment of the present invention, a multi-gastightness structure is implemented by surface-to-surface contact between a polymer liner and a metallic locker instead of a gastight structure that depends only on a general O-ring, and as a result, it is possible to improve gastightness by a simplified structure without using an additional component.

According to the exemplary embodiment of the present invention, it is possible to utilize repulsive force of the nozzle and the liner using tightening pressure of the locker, thereby reducing weights of products and improving manufacturability and product efficiency of the pressure vessel by simplifying a structure.

Other aspects and preferred embodiments of the invention are discussed infra.

BRIEF DESCRIPTION OF THE DRAWINGS

The above and other features of the present invention will now be described in detail with reference to certain exemplary embodiments thereof illustrated in the accompanying drawings which are given hereinbelow by way of illustration only, and thus are not limitative of the present invention, and wherein.

Figure 1:
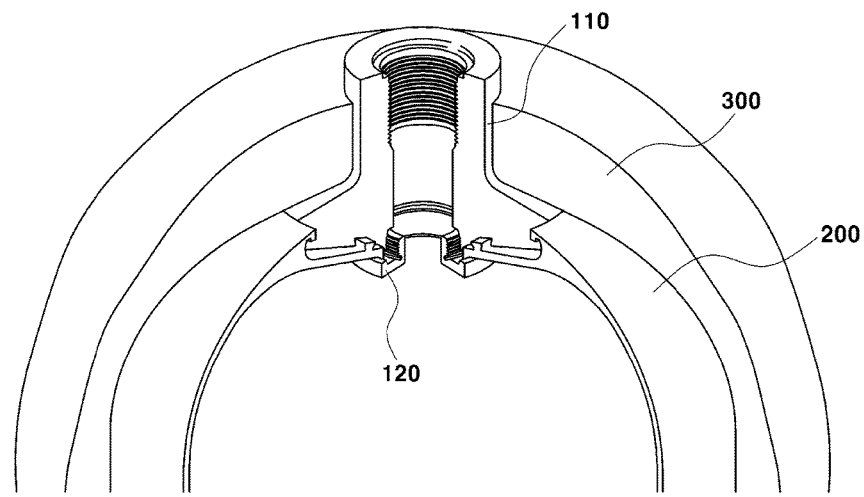
FIG. 1 is a perspective view illustrating a configuration of a pressure vessel having a multi-sealed nozzle unit according to an exemplary embodiment of the present invention.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present invention may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, reference will now be made in detail to various embodiments of the present invention, examples of which are illustrated in the accompanying drawings and described below. While the invention will be described in conjunction with exemplary embodiments, it will be understood that the present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

The present invention relates to a pressure vessel which stores high-pressure gas, and particularly, to a nozzle unit which may ensure gastightness by preventing high-pressure gas stored in a vessel from leaking and has a comparatively simple structure, and a pressure vessel including the nozzle unit.

In particular, the present invention relates to a pressure vessel for storing fuel gas of a vehicle, and for example, the present invention may be applied to a pressure vessel such as the type 4 pressure vessel.

In the case of the type 4 liner which is currently used, a coupling structure between a metallic nozzle and a plastic body is broadly classified into an integrated injection-molded structure and an assembled structure, and as a method of maintaining gastightness, there are the following methods: a method of sealing the metallic nozzle and the plastic body by an O-ring or a gasket, and a sealing method of bringing a tank valve O-ring, which is coupled to a tank, into direct contact with a plastic liner body.

However, it should be noted that the pressure vessel, which is described as an exemplary embodiment of the present invention, is not limited to the aforementioned type vessel, and any structure may be applied without limitation as long as the vessel body and the nozzle unit are coupled by a predetermined coupling structure.

Here, the predetermined coupling structure means a structure that includes a nozzle body, a vessel body which is coupled to the nozzle body to define an inner wall surface of a pressure vessel, and a locker which is fastened to any one of the nozzle body and the vessel body.

Therefore, it should be construed that the present invention is not limited to the exemplary embodiment and the drawings presented as the exemplary embodiment, and includes various examples having the predetermined coupling structure for the nozzle unit.

In the present invention, the vessel body refers to a configuration which is coupled to the nozzle unit by the predetermined coupling structure, and defines a part of the vessel. Therefore, the vessel body is not interpreted as being limited to the meaning of the vessel itself, and for example, the vessel body may be the liner of the type 4 pressure vessel.

The pressure vessel according to the present invention is a pressure vessel including a nozzle unit which will be described below, and the pressure vessel according to the present invention includes the configuration of the nozzle unit, and may include additional configurations such as a reinforcing layer, and the vessel body which defines an external appearance of the pressure vessel.

Here, a multi-sealed nozzle unit and a pressure vessel including the same according to an exemplary embodiment of the present invention will be described in detail with reference to the accompanying drawings.

The present invention is characterized by including a dual gastightness structure made by applying both a surface-to-surface contact sealing structure between the locker and the vessel body and the existing sealing structure such as an O-ring or a gasket.

In particular, like the type 4 vessel, the present invention provides stable sealing even when a metallic locker and a polymer liner, which are made of different materials, are joined together, and as a result, the prevent invention is very useful for the pressure vessel having the same structure as the type 4 vessel.

Figure 2:
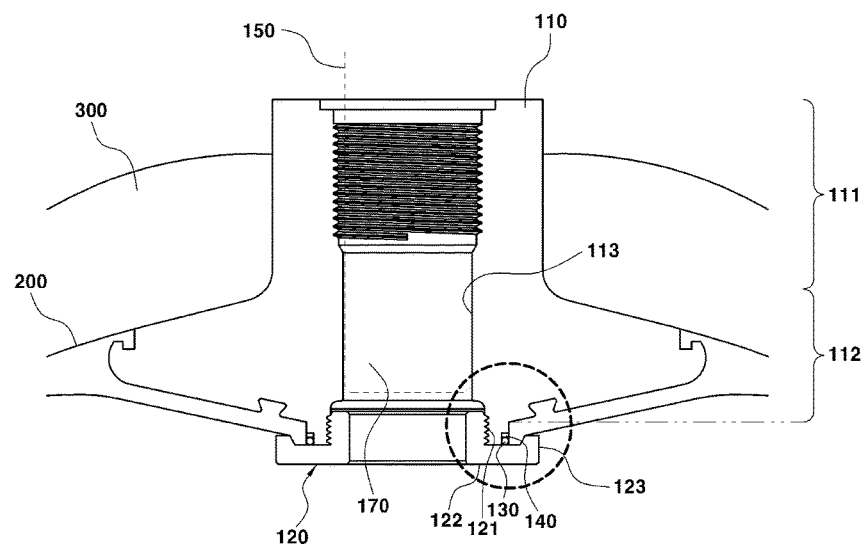
FIG. 2 is a cross-sectional view of the multi-sealed nozzle unit according to the exemplary embodiment of the present invention.
Figure 3:
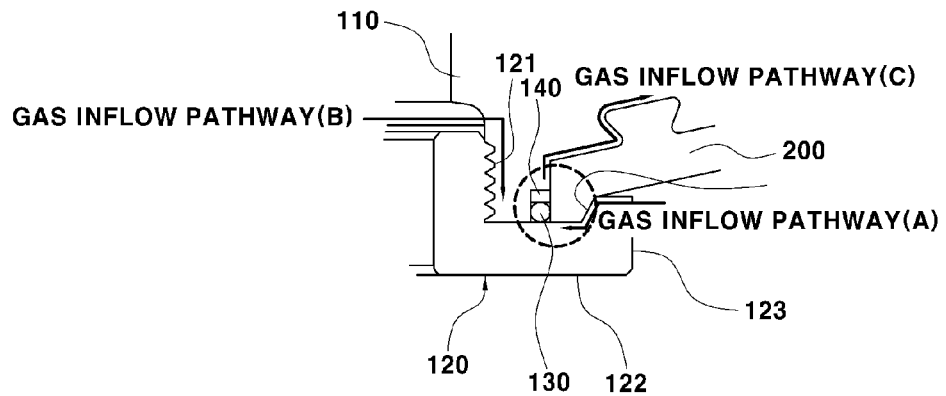
FIG. 3 is a partially enlarged view of the nozzle unit illustrated in FIG. 2.
Figure 4:
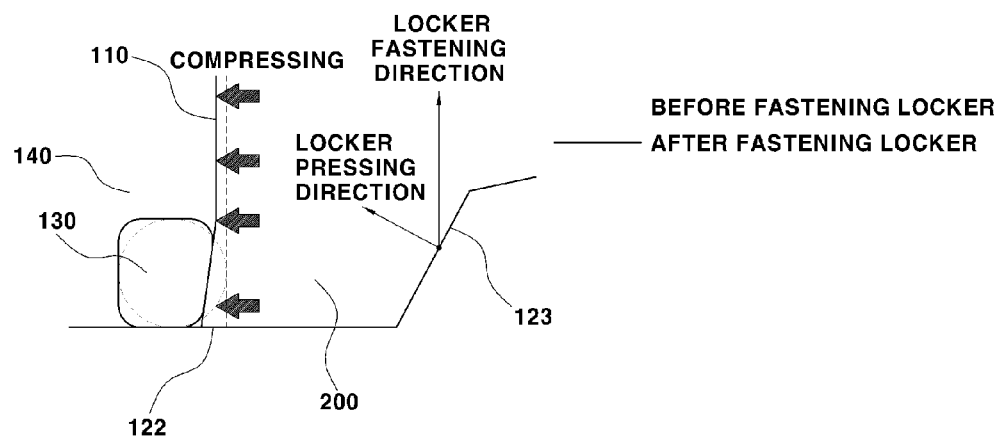
FIG. 4 is a partially enlarged view of the nozzle unit illustrated in FIG. 3.

FIG. 1 is a view illustrating a configuration of a pressure vessel having a multi-sealed nozzle unit according to an exemplary embodiment of the present invention, and FIGS. 2 to 4 are views each illustrating the multi-sealed nozzle unit or a part of the nozzle unit according to the exemplary embodiment of the present invention.

As illustrated in FIG. 1, the pressure vessel according to the exemplary embodiment of the present invention has the nozzle unit formed to allow gas to flow into the vessel or to be discharged to the outside of the vessel.

Referring to an example illustrated in FIG. 1, the nozzle unit has a metallic nozzle body 110 configured to be fastened to a polymer liner that defines a vessel body 200, and the nozzle unit has a structure in which a locker 120 in the vessel is fastened to the nozzle body 110, thereby ensuring gastightness of a fastening structure between the polymer liner and the nozzle body 110.

For example, the nozzle body 110 may be manufactured to have an injection-molded structure integrated with the polymer liner or a structure made by assembling separate components, or may have a hybrid structure including the integrated injection-molded structure and the assembled structure.

The locker 120 may be configured to have a thread structure fastened to an inner wall surface of an inner flow path of the nozzle body 110. In addition, according to the exemplary embodiment of the present invention, a reinforcing layer 300, which is made of a composite material, may be formed at an outer side of the polymer liner.

FIG. 2 is an enlarged cross-sectional view of the nozzle unit in the pressure vessel in FIG. 1, and illustrates a dual sealing structure formed by fastening the locker 120 to the nozzle body.

Specifically, as illustrated in FIG. 2, the nozzle unit according to the present invention includes the nozzle body 110 and the vessel body 200 which are integrally manufactured, and the locker 120 fastened to the nozzle body 110.

As illustrated in FIG. 2, a tank valve may be fixedly inserted into an upper portion of the nozzle body 110, and the locker 120 is fastened to a lower portion of the nozzle body 110. The nozzle body 110 may have an inner flow path 113 which is formed to accommodate the tank valve and communicate with the interior of the vessel so as to allow gas to flow therethrough, and the nozzle body 110 includes a nozzle neck 111 which protrudes toward the outside of the vessel while defining an outer wall of the inner flow path 113. In addition, a nozzle shoulder 112, which extends downward along an outer circumference of the nozzle neck 111, is included at a lower side of the nozzle body 110.

The nozzle body 110 is formed integrally with the vessel body 200 by an integrated injection-molded manner or an assembled manner as described above, and as illustrated in FIG. 2, an end of the nozzle shoulder 112 defines a contact surface with the vessel body 200 along a circumference of the vessel.

Meanwhile, the locker 120, which presses and fixes the vessel body 200 and the nozzle body 110 while surrounding a part of the vessel body 200 and a part of the nozzle body 110, is fastened to a bottom portion of the nozzle body 110.

According to the exemplary embodiment of the present invention, the locker 120 has a hollow bolt shape as illustrated in FIG. 1, and an annular groove is formed in a head portion (a lower structure in FIG. 2) of the locker 120 so that the locker 120 may be fastened while accommodating a part of the nozzle body 110 and a part of the vessel body 200.

As illustrated in FIG. 2, the locker 120 includes a fastening portion 121 which is fastened to the nozzle body 110, an extension portion 122 which extends outwardly from the fastening portion 121, and a pressing end 123 which is formed at one side of the extension portion 122 and has an annular inclined surface inclined inwardly.

Specifically, the locker 120, which has a hollow bolt shape, is configured to be fastened to a nut structure at the bottom portion of the nozzle body 110 by the fastening portion 121. The fastening portion 121 is configured to be inserted into the inner flow path 113 of the nozzle body 110 and fastened to internal threads on the inner wall surface of the inner flow path, and the fastening portion 121 has an annular shape as illustrated in FIG. 1.

The extension portion 122 is formed at a lower side of the fastening portion 121 in a radial direction of the locker 120, and the pressing end 123 is formed at an end at the other side of the extension portion 122.

The extension portion 122 has a length so that the extension portion 122 may accommodate downwardly protruding portions of the nozzle body 110 and the vessel body 200.

Meanwhile, the pressing end 123 includes a portion which is generally in parallel with the fastening portion 121 and protrudes upward, such that the locker 120 has the annular groove.

Specifically, as illustrated in FIGS. 2 and 3, the pressing end 123 has an annular inclined surface inclined inwardly, and the annular inclined surface, together with a fastening surface of the fastening portion 121 and an upper surface of the extension portion 122, forms the annular groove. The inclined surface may be formed as an inclined surface which is inclined at a predetermined angle with respect to a fastening direction of the fastening portion 121.

The pressing end 123 is configured to press the vessel body 200 while being in contact with the vessel body 200 along the annular inclined surface in a state in which the locker 120 is fastened to the nozzle body 110. Since the pressing end 123 of the locker 120 presses the nozzle body 110 and the vessel body 200 by fastening force of the locker 120 as described above, it is possible to ensure primary gastightness against the stored fluid.

Specifically, the pressing end 123 of the locker 120 presses the contact surface of the vessel body 200 as the locker 120 is fastened to the nozzle body 110, and the movement of the fluid may be restricted when the contact surface of the vessel body 200 is sufficiently tightened by the pressing end 123, thereby ensuring gastightness by mechanical coupling.

A fine flow path, through which gas may move, is formed in a contact surface formed by the locker 120 and the nozzle body 110 or by the locker 120 and the vessel body 200, and the exemplary embodiment of the present invention has another feature in that a first sealing member 130 is installed in the nozzle unit in order to block the movement of the gas.

In this regard, FIG. 3 is an enlarged view of a part (a dotted circle illustrated in FIG. 2) of the nozzle unit illustrated in FIG. 2, and in the present exemplary embodiment, FIG. 3 specifically illustrates gas flow pathways existing in a state in which the locker 120 is fastened.

As illustrated in FIG. 3, according to the present exemplary embodiment, a first gas inflow pathway A is formed in a contact portion between the pressing end 123 and the vessel body 200, and a second gas inflow pathway B is formed between the vessel body 200 and the fastening portion 121. Meanwhile, the inflow gas leaks to the outside through a gas leakage pathway C formed along a contact surface between the nozzle body 110 and the vessel body 200.

Therefore, in the exemplary embodiment of the present invention, the first sealing member 130, which blocks gas from flowing in from the gas inflow pathway formed along the annular inclined surface, is included in the nozzle unit in order to prevent the gas leak.

That is, as illustrated in FIG. 3, in a state in which the locker 120 is fastened to the nozzle body 110, the first sealing member 130 is placed in the groove of the locker 120 in a state in which the first sealing member 130 is interposed between the nozzle body 110 and the vessel body 200.

That is, in order to provide excellent gastightness, each of the nozzle body 110 and the vessel body 200 has the protruding portions which protrude toward the lower side at which the locker 120 is fastened, and the first sealing member 130 is inserted between the protruding portions.

As the locker 120 is fastened, the inserted first sealing member 130 comes into direct contact with the upper surface of the extension portion 122 of the locker 120, that is, the annular groove, and as a result, gastightness is formed at a position where the nozzle body 110, the vessel body 200, and the locker 120 meet together.

Therefore, it is possible to inhibit gas from leaking from the gas inflow pathway A or B to the gas leakage pathway C.

Meanwhile, FIG. 4 is an enlarged view of a part (a dotted circle in FIG. 3) of the nozzle unit illustrated in FIG. 3, and explains a state in which dual gastightness is formed when the vessel body 200 is pressed by the locker 120. The pressing end 123 of the locker 120, particularly, the inclined surface of the pressing end 123 forms the dual gastightness while functioning complementarily with the first sealing member.

Specifically, as the locker 120 is fastened, the pressing end 123 presses the vessel body 200 while coming into contact with the vessel body 200, and as a result, primary gastightness is formed between the vessel body 200 and the pressing end (locker). In addition, the pressed vessel body 200 presses the first sealing member 130 by a radial component of pressing force, thereby ensuring secondary gastightness by the first sealing member 130.

As illustrated in FIG. 4, the first sealing member 130 is configured as an O-ring, and may be used together with a back-up ring 140.

Figure 5:
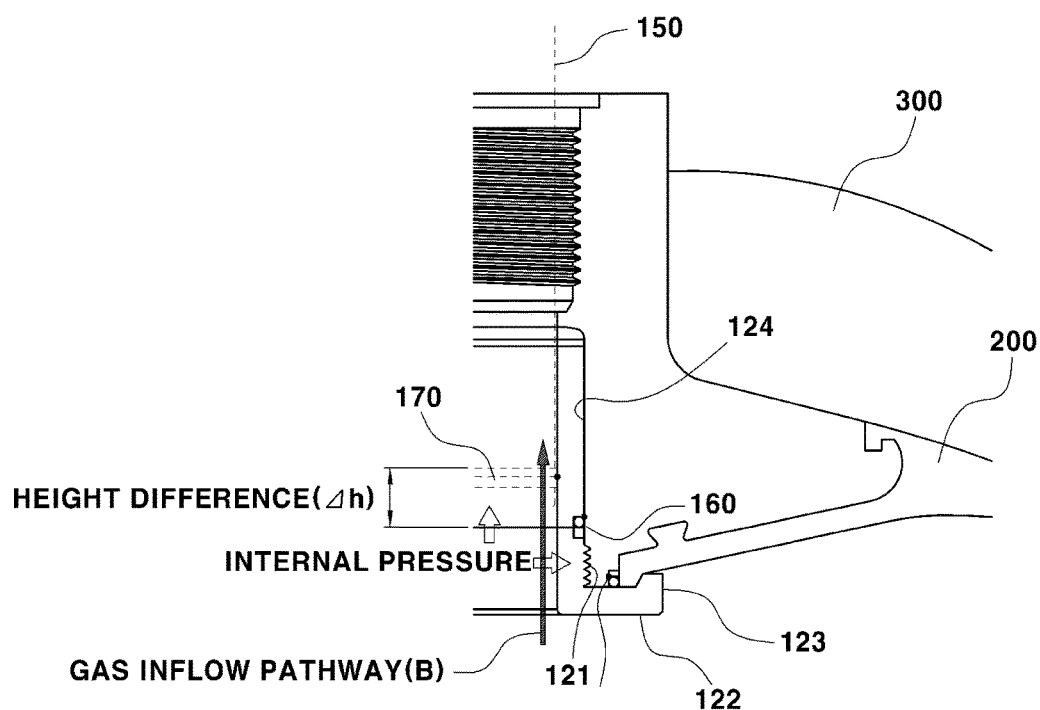
FIG. 5 is a cross-sectional view illustrating a multi-sealed nozzle unit according to another exemplary embodiment of the present invention.

FIG. 5 is a cross-sectional view illustrating a multi-sealed nozzle unit according to another exemplary embodiment of the present invention.

As illustrated in FIG. 5, the present exemplary embodiment is characterized by further including an additional sealing member in addition to the first sealing member 130.

Specifically, an extending insertion portion 124, which extends in a length direction of the inner flow path 113 of the nozzle body 110, is formed at an upper side of the fastening portion 121 of the locker 120, and a second sealing member 160 is configured to be interposed between the extending insertion portion 124 and the nozzle body 110. The second sealing member 160 functions as blocking gas from flowing in from a nozzle inner flow path.

In still another exemplary embodiment of the present invention, a vessel valve 150 is inserted and mounted into the inner flow path 113 of the nozzle body 110, and a third sealing member 170 is configured to be interposed between an outer surface of the vessel valve 150 and an inner surface of the extending insertion portion 124.

That is, the valve may be installed at the nozzle unit side of the vessel so as to intermit an outflow and an inflow of gas, and the vessel valve 150 is inserted into the inner flow path 113 of the nozzle body 110 and extends into the vessel.

Therefore, the third sealing member 170 prevents gas from leaking through a flow path existing between the vessel valve 150 and an inner wall of the nozzle body 110.

However, the third sealing member 170 may be configured to be positioned closer to a vessel inlet side than the second sealing member 160. This is to improve gastightness of the second sealing member 160 by using pressure of gas existing in the pressure vessel. The third sealing member 170 is positioned closer to the vessel inlet side, that is, closer to a portion of the nozzle body 110 which protrudes toward the outside of the vessel (i.e., the third sealing member 170 is positioned at an upper side in FIG. 5), and as a result, it is possible to ensure gastightness by using pressure in the vessel. Therefore, as illustrated in FIG. 5, gastightness points of the respective sealing members are set so that there is a predetermined height difference Δh.

Figure 6:
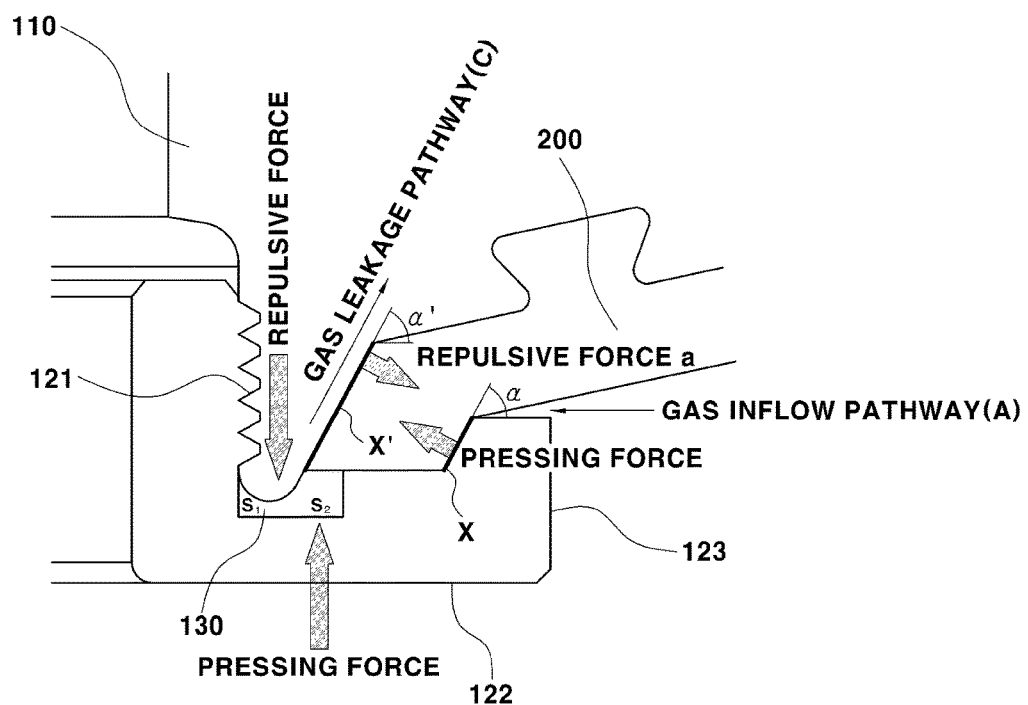
FIG. 6 is a cross-sectional view illustrating a multi-sealed nozzle unit according to still another exemplary embodiment of the present invention.

FIG. 6 is a cross-sectional view illustrating a multi-sealed nozzle unit according to still another exemplary embodiment of the present invention.

The configuration illustrated in FIG. 6 is basically similar to the examples illustrated in FIGS. 1 to 4, but has a difference in that a gasket is used as the first sealing member 130, and a deformable structure is provided to form gastightness by pressing a partial region of the gasket.

That is, as illustrated in FIG. 6, the annular groove, which includes the upper surface of the extension portion 122, is formed in the locker 120, and the first sealing member 130 is placed in the groove.

The pressing end 123 of the locker 120 identically includes the inclined surface directed inwardly, and the nozzle body 110 has an annular protruding portion which further protrudes downward from the contact surface with the first sealing member 130 compared with the vessel body 200, that is, the nozzle body 110 has a portion which protrudes toward a lower side of the locker shoulder 112.

In this case, the gasket, which is the first sealing member 130 and made of an elastic material, is configured to be simultaneously in contact with a part of the metallic nozzle and a part of the vessel body 200, and the gasket in a partial region is compressed by the protruding portion of the nozzle body 110, thereby forming sealing.

In this case, a contact surface X', which is formed between the vessel body 200 and the nozzle body 110 in the vicinity of the first sealing member 130, may be configured to have an angle α' of the contact surface which is equal or similar to an angle α of the inclined surface X of the pressing end 123, and in this case, it is possible to additionally ensure gastightness of the gas leakage pathway C by using fastening force of the locker 120.

In particular, as illustrated in FIG. 6, the protruding portion of the nozzle body, which extends while forming the contact surface X' between the vessel body and the nozzle body, has a structure which protrudes below the vessel body so as to have a shape that may sufficiently press the gasket. Therefore, the protruding portion of the nozzle body exerts pressure in a space S1 in which the gasket is positioned below the protruding portion of the nozzle body, and the gasket having elasticity is deformed to a space S2, such that sealing is formed in right and upper regions of the gasket.

As described above, according to the exemplary embodiment of the present invention, in order to ensure gastightness of the nozzle unit of the pressure vessel, it is possible to ensure primary gastightness on the contact surface by mechanical coupling force and to ensure additional gastightness by using the sealing member, thereby greatly improving gastightness and greatly improving productivity by using a simple structure for fastening the locker.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A nozzle for a pressure vessel, comprising:
   a nozzle body which is coupled to a vessel body that defines an inner wall surface of the pressure vessel, and has an inner flow path through which gas flows inside and outside of the pressure vessel; and a locker which is fastened to a lower portion of the nozzle body,
wherein the locker has a fastening portion which has a hollow bolt shape and is thread-fastened to a nut structure at the lower portion of the nozzle body, an extension portion which extends outwardly from the fastening portion, and a pressing end which is formed at one side of the extension portion and has an annular inclined surface inclined inwardly,
the pressing end is configured to press the vessel body while being in contact with the vessel body along the annular inclined surface when the locker is fastened to the nozzle body, and
the nozzle further includes a first sealing member for blocking gas from flowing in from a gas inflow pathway formed along the annular inclined surface.

2. The nozzle of claim 1, wherein the locker is thread-fastened to the inner flow path of the nozzle body by the fastening portion.

3. The nozzle of claim 1, wherein an annular groove is formed in the locker by the inclined surface of the pressing end and an upper surface of the extension portion, and a part of the nozzle body and a part of the vessel body are accommodated in the groove so as to be in contact with the extension portion.

4. The nozzle of claim 3, wherein when the locker is fastened to the nozzle body, the first sealing member is placed in the groove of the locker in a state in which the first sealing member is interposed between the nozzle body and the vessel body.

5. The nozzle of claim 2, wherein the inclined surface of the pressing end is an inclined surface inclined at a predetermined angle with respect to a fastening direction of the fastening portion.

6. The nozzle of claim 1, wherein an extending insertion portion, which extends in a length direction of the inner flow path of the nozzle body, is formed at an upper side of the fastening portion of the locker, and a second sealing member is interposed between the extending insertion portion and the nozzle body.

7. The nozzle of claim 6, wherein a vessel valve is inserted and mounted into the inner flow path of the nozzle body, and a third sealing member is interposed between an outer surface of the vessel valve and an inner surface of the extending insertion portion.

8. The nozzle of claim 7, wherein the third sealing member is positioned closer to a vessel inlet side than the second sealing member.

9. The nozzle of claim 1, wherein an annular groove, which includes the upper surface of the extension portion, is formed in the locker, and the first sealing member is placed in the annular groove,
wherein the first sealing member is a gasket which is in contact with a part of the nozzle body and a part of the vessel body.

10. The nozzle of claim 9, wherein the nozzle body and the vessel body are configured to have a contact surface parallel to the inclined surface of the locker, and the nozzle body is formed to have an annular protruding portion which protrudes below the vessel body from a contact surface with the first sealing member.

11. A pressure vessel, comprising:
a nozzle body which has an inner flow path through which gas flows inside and outside of the pressure vessel;
a vessel body which is coupled to the nozzle body to define an inner wall surface of the pressure vessel; and
a locker which is fastened to a lower portion of the nozzle body,
wherein the locker has a fastening portion which has a hollow bolt shape and is thread-fastened to a nut structure at the lower portion of the nozzle body, an extension portion which extends outwardly from the fastening portion, and a pressing end which is formed at one side of the extension portion and has an annular inclined surface inclined inwardly,
the pressing end is configured to press the vessel body while being in contact with the vessel body along the annular inclined surface when the locker is fastened to the nozzle body, and
the pressure vessel further includes a first sealing member for blocking gas from flowing in from a gas inflow pathway formed along the annular inclined surface.

12. The pressure vessel of claim 11, wherein the locker is thread-fastened to the inner flow path of the nozzle body by the fastening portion.

13. The pressure vessel of claim 11, wherein an annular groove is formed in the locker by the inclined surface of the pressing end and an upper surface of the extension portion, and a part of the nozzle body and a part of the vessel body are accommodated in the groove so as to be in contact with the extension portion.

14. The pressure vessel of claim 13, wherein when the locker is fastened to the nozzle body, the first sealing member is placed in the groove of the locker in a state in which the first sealing member is interposed between the nozzle body and the vessel body.

15. The pressure vessel of claim 12, wherein the inclined surface of the pressing end is an inclined surface inclined at a predetermined angle with respect to a fastening direction of the fastening portion.

16. The pressure vessel of claim 11, wherein an extending insertion portion, which extends in a length direction of the inner flow path of the nozzle body, is formed at an upper side of the fastening portion of the locker, and a second sealing member is interposed between the extending insertion portion and the nozzle body.

17. The pressure vessel of claim 16, wherein a vessel valve is inserted and mounted into the inner flow path of the nozzle body, and a third sealing member is interposed between an outer surface of the vessel valve and an inner surface of the extending insertion portion.

18. The pressure vessel of claim 17, wherein the third sealing member is positioned closer to a vessel inlet side than the second sealing member.

19. The pressure vessel of claim 11, wherein an annular groove, which includes the upper surface of the extension portion, is formed in the locker, and the first sealing member is placed in the annular groove,
wherein the first sealing member is a gasket which is in contact with a part of the nozzle body and a part of the vessel body.

20. The pressure vessel of claim 19, wherein the nozzle body and the vessel body are configured to have a contact surface parallel to the inclined surface of the locker, and the nozzle body is formed to have an annular protruding portion which protrudes below the vessel body from a contact surface with the first sealing member.

* * * * *